(12) United States Patent
Eklund et al.

(10) Patent No.: US 7,927,039 B2
(45) Date of Patent: Apr. 19, 2011

(54) METHOD FOR IMPROVING VERMICULITE'S INTAKE OF AMMONIUM IONS, ABSORPTION MATERIAL, ITS USES AND METHOD OF REMOVING AMMONIUM FROM ENVIRONMENT

(75) Inventors: Olav Eklund, Turku (FI); Vesa Tokopainen, Lemu (FI); Alexey Shebanov, St. Petersburg (RU); Nina Åkerback, Helsingby (FI); Sten Engblom, Korsholm (FI)

(73) Assignees: Turun Yliopisto, Turun Yliopisto (FI); Svenska Osterbottens Forbund for utbildning och kultur, Vasa (FI)

( * ) Notice: Subject to any disclaimer, the term of this patent is extended or adjusted under 35 U.S.C. 154(b) by 393 days.

(21) Appl. No.: 11/993,771

(22) PCT Filed: Jun. 30, 2006

(86) PCT No.: PCT/FI2006/000234
§ 371 (c)(1),
(2), (4) Date: Aug. 27, 2008

(87) PCT Pub. No.: WO2007/003689
PCT Pub. Date: Jan. 11, 2007

(65) Prior Publication Data
US 2010/0132423 A1    Jun. 3, 2010

(30) Foreign Application Priority Data

Jul. 1, 2005   (FI) .................................. 20050700

(51) Int. Cl.
| | |
|---|---|
| C01B 33/26 | (2006.01) |
| C05D 9/00 | (2006.01) |
| B09C 1/08 | (2006.01) |
| B01D 53/14 | (2006.01) |
| C02F 1/28 | (2006.01) |
| B01J 21/16 | (2006.01) |
| B01J 20/16 | (2006.01) |

(52) U.S. Cl. .................. 405/128.5; 47/58.1 SC; 71/62; 71/903; 95/128; 210/749; 210/766; 210/903; 405/128.55

(58) Field of Classification Search .................. 502/80; 71/61, 62, 903; 423/328.3; 210/766, 749, 210/903; 95/128; 47/58.1 SC; 405/128.5, 405/128.55
See application file for complete search history.

(56) References Cited

U.S. PATENT DOCUMENTS

| | | | |
|---|---|---|---|
| 3,677,939 A | 7/1972 | Patil et al. | 210/36 |
| 4,952,388 A * | 8/1990 | Rittler | 423/328.3 |
| 5,082,813 A | 1/1992 | Taborsky | 502/60 |
| 5,169,825 A | 12/1992 | Okubo et al. | 502/407 |
| 5,254,410 A | 10/1993 | Langer et al. | 428/402 |
| 5,304,365 A | 4/1994 | Taborsky | 423/352 |
| 7,288,499 B1 * | 10/2007 | Lovell et al. | 502/80 |
| 2003/0201206 A1 * | 10/2003 | Poncelet et al. | 208/143 |

FOREIGN PATENT DOCUMENTS

| | | |
|---|---|---|
| EP | 0 476 135 | 3/1992 |
| JP | 56-136648 | 10/1981 |

OTHER PUBLICATIONS

Weis et al., "Dehydration and rehydration of natural Mg-vermiculite," 45 *Geologica Carpathica—Series Clays* 33-39 (1994).

* cited by examiner

*Primary Examiner* — Wayne Langel
(74) *Attorney, Agent, or Firm* — James C. Lydon

(57) ABSTRACT

The invention relates to a method for improving vermiculite's intake of ammonium, in which method heating of the crude vermiculite is conducted to a temperature where vermiculite's third dehydration step takes place, the temperature being lower than the temperature where vermiculite's fourth dehydration/dehydroxylation step takes place. The invention relates also to use of the obtained vermiculite and to an absorption material, comprising vermiculite material and additives, where at least 50% of the vermiculite material comprises vermiculite, which has undergone the third dehydration step but not the fourth dehydration/dehydroxylation step. The invention relates also to use of thermally treated and ammonium doped vermiculite as fertilizer/soil conditioner.

15 Claims, 2 Drawing Sheets

METHOD FOR IMPROVING VERMICULITE'S INTAKE OF AMMONIUM IONS, ABSORPTION MATERIAL, ITS USES AND METHOD OF REMOVING AMMONIUM FROM ENVIRONMENT

FIELD OF THE INVENTION

The present invention relates to a method for improving vermiculite's intake of ammonium ions, new absorption material, its use and a method of removing ammonium ions from environment defined in the preambles of the independent claims presented hereafter.

BACKGROUND OF THE INVENTION

Vermiculite is a sheet aluminosilicate of the hydromica group having a monoclinic crystal system. In the nature vermiculite is formed by weathering or a hydrothermal process at the expense of mica. A simplified general chemical formula of vermiculite can be expressed as $(M^+, M^{2+})_{0.45-0.75}{}^A M(Y^{2+}, Y^{3+})_{5-6}{}^O [(Al, Si)_8 O_{20}]^T (OH)_4{}^T 8xH_2O^A$, in which formula the structural sites are expressed with letters A, O and T. A denotes an interlayer, O an octahedral-fold coordinated site and T a structure-forming tetrahedral-coordinated site. Furthermore, in the general formula $M^+$ denotes principally a $K^+$, $Na^+$, or $NH_4^+$ cation, and $M^{2+}$ denotes a cation, typically $Mg^{2+}$. Sometimes minor amounts of $Ca^{2+}$ and $Ba^{2+}$ cations may be present in A-site. $Mg^{2+}$ and $Fe^{2+}$ occupy $Y^{2+}$-positions, $Fe^{3+}$ and $Al^{3+}$ occupy $Y^{3+}$-positions.

In vermiculite's structure O- and T-sites follow each other in proportion 1:2, and they form a sandwich-like structure with an interlayer between each two single T-OT-successions. A schematic presentation of vermiculite's layered structure is presented in FIG. 1.

Isomorphous substitutions take usually place in all structural units of vermiculite. The dimension of the interlayer in C-direction, conventionally measured as basal spacing distance $Cd_{002}$, varies dependent on the cation occupancy in the interlayer. Depending on the interplane distance, different cations have a preference for occupying the interlayer of the vermiculite structure. Magnesium ions normally occupying most of the interlayer sites can be substituted to e.g. potassium, sodium, rubidium, calcium, barium or ammonium ions. Vacancies can also be present in the crystal structure. Hydration-dehydration reactions can take place in the interlayer.

Water layers are also available in the interlayer site of the vermiculite structure. Pseudohexagonal rings in the tetrahedral-fold site are coordinated with OH-groups. During heating to a temperature up to about 1100° C. the vermiculite is dehydrated and exfoliated. During the heating, crude vermiculite passes through five discrete structural transformations, caused by the step-wise dehydration of vermiculite. Each dehydration step corresponds to the shrinking of the lattice dimensions of the vermiculite crystal, e.g. measurable as $Cd_{002}$. The first three steps of dehydration are reversible, whereby the second and third dehydration steps take place at temperature ranges of 190-280° C. and 300-440° C., respectively. The last two dehydration/dehydroxylation steps are irreversible, leading to consequent decomposition of the vermiculite to talc and, further, to enstatite $Mg_2Si_2O_6$. During the first three dehydration steps $H_2O$ is released from the lattice, but during the last two steps OH is released. The reversibly dehydrated vermiculite can be hydrated back in an aqueous solution, and the compressed lattice is getting expanded back to the initial state.

It is known that vermiculite has a capacity to incorporate ammonium into its structure. However, commercially available expanded vermiculites and vermiculite bearing products are not efficient enough in their ammonium intake so that they could be used commercially for removal of ammonium ions from the environment.

In the nature ammonium ions function as a nutrient. Therefore removal of excess of ammonium ions e.g. from waste water is important before water is fed back to the environment in order to avoid eutrophication. It would be beneficial to have an absorption material that would be able to absorb fast relatively large amounts of ammonium ions. It would also be an advantage if this absorption material could be used further after ammonium absorption, instead of taking it to the waste tip.

OBJECTS AND SUMMARY OF THE INVENTION

The object of the present invention is to minimise or even to totally eliminate the above-mentioned problems.

The object is thus to provide a method for enhancing the vermiculite's capacity to absorb ammonium ions.

Another object of the present invention is to provide an absorption material that efficiently binds ammonium ions immobilising them in the crystal structure.

In order to achieve the above-mentioned objects the present invention is characterised in what is defined in the characterising parts of the independent claims presented hereafter.

A typical method for improving vermiculite's intake of ammonium according to the invention comprises heating of the crude vermiculite, the heating being conducted the heating being conducted to a temperature where vermiculite's third dehydration step takes place, and the temperature being lower than the temperature where vermiculite's fourth dehydration/dehydroxylation step takes place.

According to the invention vermiculite prepared according to the invention is typically used as ammonium absorbent.

According to invention a typical absorption material comprises vermiculite material and additives, the vermiculite material comprising at least 50% vermiculite, which has undergone the third dehydration step but not the fourth dehydration/dehydroxylation step.

A typical method of removing ammonium from environment according to the invention comprises mixing of absorption material according to invention with an environment medium, such as soil, gas, sewage water and the allowing the absorption material react with the medium in order to remove the ammonium ions to a desired level.

DETAILED DESCRIPTION OF THE INVENTION

Figure 1:
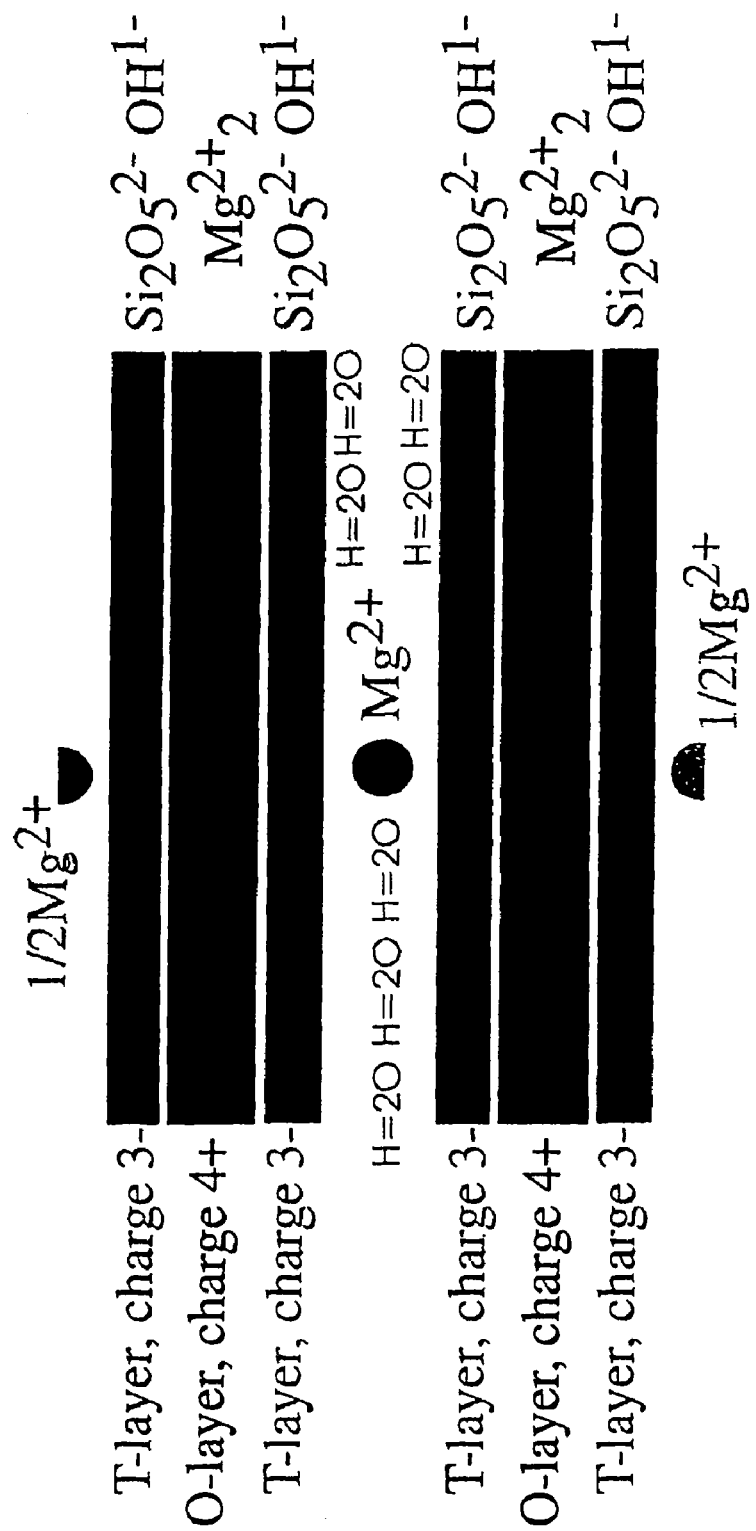
FIG. 1 is a schematic presentation of vermiculite's layered structure.

Now it has been surprisingly found out that when vermiculite is heated to a temperature where vermiculite's third dehydration step takes place, the vermiculite's crystal structure becomes optimal for incorporation of ammonium ions. The exact temperature of the third dehydration step can be determined for example by thermogravimetric analysis, TG, which is well-known for a person skilled in the art. The temperature range where the third structural transformation step takes place may be different for different types of vermiculite. According to the invention the heating temperature is lower than the temperature where vermiculite's fourth dehydration step takes place, thus avoiding the formation of non-efficient vermiculite material.

Vermiculite particles that are obtained by the present invention show a clearly enhanced ability to absorb ammonium ions from the environment, e.g. from sewage water, when compared to conventionally prepared exfoliated vermiculites. It is assumed that, without being bound by the theory, when vermiculite is heated to a temperature where the third dehydration step takes place the interplane distance of vermiculite, i.e. basal spacing distance, $Cd_{002}$, is decreased near to a value ranging from 9.9-10.5 Å. When such vermiculite is subsequently allowed to be rehydrated in an ammonium-rich environment, the mineral's crystal lattice expands back towards to the original water-saturated state. During this rehydration process the interlayer width is increased towards a value of 14.4 Å, which is approximately the interlayer width of initial hydrated vermiculite. The structure is typically stabilised in the $Cd_{002}$ range of 11.4-11.8 Å. During this expansion the interlayer width passes through an intermediate value of $Cd_{002}=11.24$ Å. This latter value is theoretically optimal for absorption of ammonium molecules in terms of direct cation exchange to the interlayer of vermiculite's lattice structure. Consequently, both the number of the ammonium molecules that are taken up by the crystal lattice of vermiculite and the rate of ammonium intake is improved for vermiculite particles heated according to present invention. The ammonium ions are thus effectively reversibly immobilised in the crystal structure of the vermiculite prepared according to the present invention.

According to one embodiment of the present invention the heating is conducted to a temperature where the vermiculite's interplane distance $Cd_{002}$ is in the range of 9.9-12 Å, preferably 10-11.5 Å, more preferably 10-11.2 Å. The interplane distance of the vermiculite can be defined by using X-ray diffraction, which method is known for a person skilled in the art.

Vermiculite that is used in the present invention can be of natural origin or can be synthetically prepared. As a starting material a crude natural vermiculite concentrate can be used. According to one preferred embodiment the vermiculites that are used in the invention are those having a strong dominance of magnesium cations over other cations, or having almost only magnesium cations in the interlayer, while the remaining positions therein are occupied by vacancies. Also magnesium rich vermiculites with the minor substitutions of potassium cations in the interlayer can be used. The potassium content is typically 0.1-2.7 weight-% in the analysis. Vermiculite's capability to absorb ammonium is decreased when the content of potassium in the interlayer becomes significant, typically 4-5 weight-% in the analysis or higher.

According to another embodiment of the present invention the heating is conducted at a temperature range of 300-460° C., usually 350-460° C., sometimes 380-450° C., typically 400-460° C., more typically 420-460° C., preferably 420-440° C. In certain embodiments the heating is conducted at a temperature range of 405-455° C., usually 410-445° C., even 415-440° C.

According to one embodiment of the invention impurities are removed from the crude vermiculite concentrate before the heating. Impurities having magnetic character, e.g. iron oxides, can be removed by using a removal method based on magnetic susceptibility. Impurities can be removed also by washing or flotation. Such methods are known for a person skilled in the art.

It is not necessary to treat, e.g. by milling, the crude vermiculite particles before the heat treatment. Any commercially available particle size can be treated in the present invention. The particle size of the vermiculite to be treated may range from 10 µm to 5 cm. According to another embodiment of the invention the crude vermiculite is milled to a particle or grain size of 200 µm-4 mm before heating, preferably to a grain size of 1-4 mm before heating.

According to present invention no chemical treatment is necessary in order to obtain the optimal crystal parameters in vermiculite material. Thus absorption material according to the present invention can be obtained solely using described heat treatment, without any chemical process steps.

According to one embodiment of the invention the absorption material comprises vermiculite material and additives. As an additive can be used sand or commercial exfoliated vermiculite or other suitable unreactive material. Absorption material comprises at least 20 weight-%, typically at least 40 weight-%, more typically at least 50 weight-%, sometimes even over 70 weight-% of vermiculite material, which has undergone the third dehydration step but not the fourth dehydration step.

The small grain size provides a large surface area for fast reactions during the heating as well as for fast reactions during the ammonium intake. Large surface area provides also more surface which is available for reactions. It is however it is preferred that the grain size is big enough to prevent amorfication and agglomeration. According to one embodiment the environment medium with which the absorption material is mixed, is heated during the ammonium ion removal. The environment medium can be heated e.g. up to 50° C.

According to one embodiment of the invention the ammonium absorption reaction is allowed 2-48 hours to be completed. As the vermiculite according to the invention has an optimal lattice structure for absorption of ammonium ions the absorption reaction is very fast. The efficiency of the reaction can be enhanced by stirring. The rate of the absorption reaction depends on the medium in which the absorption is conducted as well as the concentration of the ammonium ions in the medium. For absorption reactions in aqueous environment it is estimated that the reaction may be nearly completed within 1 or 2 hours after the vermiculite addition.

The ammonium removal is preferably conducted at pH 2-9, typically at pH 4-7.5, most typically at pH 6-7.5.

The absorption material according to the invention can be used for absorption and removal of ammonium ions in different environment. It can be used for removal of $NH_4^+$ ions from industrial, agricultural or household wastewaters or from other $NH_4^+$ containing media, such as gases. It can be also used for ammonium ion-exchange or absorption for industrial and scientific purposes.

The absorption material, which is prepared with the present invention, can also be used for cleaning of exhaust fumes and gases of industrial plants, such as waste incineration plants etc. by absorbing $NH_4^+$ ions in the gases.

It is also possible to use the absorption material as a protective material at potentially hazardous industries, such as ammonia and ammonium chloride producing factories. It can also be used in the tanks for ammonia transportation, as a double sealed container having external sides filled with absorption material. In a case of hazardous leakages of ammonia, absorption material can be used as quick and efficient absorbent, which can also be available in large quantities.

According to one embodiment of the invention the absorption material according to the invention can be used also for absorption of urea derived $NH_4^+$ by using it as a constituent in cat sand, or as an absorption material in mobile toilets or the like.

According one interesting embodiment the absorption material can be used for removal of $NH_4^+$ ions from leakage waters of fertilized fields and forests often oversaturated with ammonium. Thus the absorption material can be used as a ground conditioner, which stabilises the free $NH_4^+$ amount in fields and/or forests fertilized with ammonia.

The absorption material according to the present invention can also be used as an ammonium immobiliser in filtering industry, in the cleaning of ammonium-polluted water or groundwater, and in high-tech chemistry for ammonium ion exchange. Furthermore the ammonium-saturated absorption material can be utilized as fertilizer of soils as well as ground conditioner.

The vermiculite prepared according to the present invention is preferably sealed into a water-proof container in order to minimise the rehydration of the treated vermiculite.

According to one embodiment of the present invention the vermiculite material that has been heat treated according to the present invention can be also used for fertilising fields, greenhouse plantations, nurseries, seedbeds, forests or the like. As explained above, the heat-treated vermiculite according to the present invention is very effective in absorbing ammonium ions. These ions, however, are not irreversibly bound to the vermiculite structure, but they are slowly released from the structure e.g. under suitable temperature and humidity conditions, due to vermiculite's weathering, microbiological activity, ion-exchange, etc. It is possible to dope vermiculite material prepared according to the present invention with ammonium and use this doped material as nitrogen fertiliser for different plants or as a soil conditioner. The doped vermiculite is e.g. mixed with the growth substrate or distributed to the forest. Under normal soil humidity conditions ammonium is slowly released from the vermiculite structure and available for plants for their biological processes.

According to one embodiment the absorption material according to the present invention can be used for cleaning ammonium rich effluents or exhaust gases.

When the material's absorption capacity is fulfilled, the ammonium rich absorption material can be removed from the cleaning process and reused as a nitrogen fertiliser. This decreases the amount of waste that is generated in the ammonium removal processes and enables the beneficial usage of the removed ammonium.

Typically the particle size of the vermiculite material that is doped with ammonium for fertilising purposes is 0.5-10 mm, typically 0.75-5 mm, preferably 1-3 mm. Typically the ammonium content of the doped vermiculite is from about 1 to 3 weight-%

EXAMPLES

Example 1

Pre-Treatment of the Samples

Vermiculites that were used in the experiment were industrial vermiculite ore concentrates, which are commercially available in large quantities. These concentrates may contain impurities in variable amounts.

Sample preparation was begun by removal of impurities from the ore concentrate by hand picking. Then the ore concentrate was milled with a knife-mill at room temperature. Milling was performed as dry milling. Milled samples were sieved in order to get samples with 75-125 µm grain size used in all experiments.

If needed, impurities were further separated from milled samples with Frantz isodynamic separator, the separation being based on magnetic susceptibility.

Thermal Treatment of the Samples

Samples comprising milled and sieved vermiculite grains were heated in Lindberg box furnace for temperatures up to 1100° C., or in Heraeus muffle for temperatures up to 1500° C. After the thermal treatment the samples were cooled in a desiccator containing silica gel.

Sample Preparation 1 or 2 grams of a vermiculite sample were added to a 100 or 200 ml bottle and a solution containing 10000 ppm $NH_4^+$ was added. Bottles were closed in airtight manner and kept for 24 or 48 hours at a temperature of 20° C. After that excess of ammonium was removed from grain surfaces by flushing the vermiculite sample two times with 100 ml deionised water. The sample was then dried in oven at 40° C. for 24 h. Prepared samples were stored in plastic airtight ampoules.

Sample Analysis

Samples were analysed by using particle-induced gamma-ray emission analysis (PIGE) technique. Samples were irradiated with a 4.2 MeV proton beam in a He-atmosphere, whereby the transitions in the atom nucleus give rise to γ-radiation. The emitted radiation is detected with a HPGe-detector, and the obtained spectrum is analysed with gamma spectrum analysis program SAMPO 90. γ-radiation at 2313 keV from the transition reaction $^{14}N(p,p'\ \gamma)^{14}N$ was used for the determination of the nitrogen concentration.

Effect of Heating Temperature to Vermiculite's Ammonium Intake Capacity

Samples of Mg-vermiculite, coded KDR, were treated at different temperatures and their capacity to intake ammonium ions was compared. Results are shown in table 1.

It can be concluded that the ammonium ion intake by vermiculites prepared according to the present invention increased clearly compared to crude vermiculite, which had not been heat-treated. The increase of ammonium intake was almost four times the intake of conventionally heat-treated vermiculite. The amount of ammonium is given as weight-% of the total nitrogen in the vermiculite material.

TABLE 1

Ammonium intake capacity of vermiculite treated at different temperatures.

| Temperature/° C. | %-N |
|---|---|
| 20 | 0.59 |
| 120 | 0.697 |
| 220 | 0.702 |
| 440 | 0.836 |
| 660 | 0.715 |
| 770 | 0.124 |
| 940 | 0.223 |
| 1150 | 0.118 |

In another experiment different types of crude and conventionally heat-treated vermiculites were compared to vermiculite material heat-treated at different temperatures. Sample numbers 1-3 comprised untreated crude vermiculite material.

Vermiculite sample numbers 4-7 were subjected to heat treatment at different temperatures under 4 hours. Sample numbers comprised commercially available exfoliated vermiculite material. pH of the samples was about 7.1. VMP/KDR-samples, Vermipu, Grace VXC and Palabora vermiculites used in the experiments have different chemical and structural properties. Results are shown in table 2.

It can be concluded that heat treatment at 410° C. improved vermiculite sample's ammonium intake capacity compared to different types of crude or commercial vermiculites or samples treated at other temperatures. The amount of ammonium is given as weight-% of the total nitrogen in the vermiculite material.

TABLE 2

Effect of heating temperature to vermiculite's ammonium intake capacity.

| Sample # | treatment T/° C. | %-N | Vermiculite material |
|---|---|---|---|
| 1 | 20 | 0.3 | Grace VXC crude vermiculite |
| 2 | 20 | 1.1 | VMP/KDR crude vermiculite |
| 3 | 20 | 0.6 | Palabora crude vermiculite |
| 4 | 120 | 1.2 | KDR vermiculite |
| 5 | 250 | 1.3 | VMP/KDR vermiculite |
| 6 | 410 | 2.0-3.0 | VMP/KDR vermiculite |
| 7 | 650 | 1.7 | VMP/KDR vermiculite |
| 8 | ~1000 | 1.6 | Exfoliated (short time) commercial Vermipu |
| 9 | ~1000 | 1.1-1.3 | Exfoliated Palabora commercial vermiculite |
| 10 | ~1000 | 0.3 | Exfoliated Grace VCX commercial vermiculite |

Effect of Heating Time to Ammonium Intake Capacity of Vermiculite

Vermiculite samples were heated to a temperature of 420° C. and kept at that temperature for different periods in order to examine the effect of heating time to vermiculite's ammonium intake capacity. Results are shown in table 3. The amount of ammonium is given as weight-% of the total nitrogen in the vermiculite material.

TABLE 3

Effect of heating time to vermiculite's ammonium intake capacity.

| T/min | water loss, weight-% | %-N |
|---|---|---|
| 0 | 0 | 1.4 |
| 2 | 10 | 1.4 |
| 10 | 15 | 1.8 |
| 60 | 15 | 1.9 |
| 240 | 15 | 2.3 |
| 1440 | 15 | 2.6 |

Effect of pH to Ammonium Intake Capacity of Vermiculite

Ammonium ion intake capacity of a crude vermiculite sample that had not be heat treated and a vermiculite sample had been heat treated according to the invention was tested at different pH values. Results are shown in table 5.

It can be concluded that pH did not have significant effect on crude vermiculite material's capacity to intake ammonium ions, as the values were relatively constant through the pH range tested. For heat-treated vermiculite, on the contrary, it can be concluded that pH had an effect on vermiculite's capacity to intake ammonium ions. It seems that the optimal pH value would be around pH 7.

TABLE 5

Effect of pH to ammonium intake capacity of vermiculite at 50° C.

| no heat treatment | | heat treatment at 440° C. | |
|---|---|---|---|
| pH | %-N | pH | %-N |
| 2.4 | 1.4 | 2.4 | 2.3 |
| 5.0 | 1.3 | 5.0 | 2.4 |
| 7.2 | 0.9 | 7.2 | 2.9 |
| 8.5 | 1.1 | 8.5 | 1.7 |
| 9.5 | 1.2 | 9.5 | 1.1 |
| 11.5 | 0.7 | 11.5 | 0.6 |

Effect of Water Temperature and Grain Size to Ammonium Ion Intake

The purpose of the experiment was to test the effect of the water temperature and grain size to ammonium ion intake ability of heat treated vermiculites.

The experiment was made by using Mg-vermiculites coded as CU and VMP/KDR samples. Three different grain size ranges were tested: <75 µm, 75-125 µm and 2-4 mm. Vermiculite materials were heat treated at 410° C.

First, the ammonium ion intake of the vermiculites was tested at temperature of 50° C. achieved by using a heat bath.

Comparative values were obtained from experiments made at temperature of 20° C. by using vermiculite with grain size of 75-125 µm. In the table the comparative examples are named as Comparative 1 and Comparative 2.

TABLE 6

Effect of heating and grain size to ammonium intake capacity of vermiculite at 50° C.

| | Grain size | | |
|---|---|---|---|
| Vermiculite material | <75 µm | 75-125 µm | 2-4 mm |
| CU sample | 1.6%-N | 1.8%-N | 1.9%-N |
| KDR sample | 2.7%-N | 2.7%-N | 3.0%-N |
| CU-sample (Comparative 1) | | ~1.5%-N | |
| KDR-sample (Comparative 2) | | 2.0-2.5%-N | |

It can be concluded that the raise of temperature slightly enhances the absorption ability of the treated vermiculite. The grain size did not play a significant role in this experiment as the absorption occurred during 24 hours with the used grain sizes.

Example 2

Absorption material prepared according to present invention was compared to conventionally heat-treated vermiculite in order to test its capacity to remove ammonium ions from sewage water. Four samples, named A1, A2, C1 and C2, comprising absorption material according to invention were prepared, as well as four comparative samples, B1, B2, D1 and D2, comprising conventionally prepared expanded vermiculite. Also two blank samples, O1 and O2, were prepared.

The average value of ammonium ions in the used sewage water was 1646 mg/l in the beginning.

200 g of absorption material having a particle size of 250-500 µm was added to a flask and 2100 ml of sewage water was added. The temperature was kept at 50° C. The samples were kept under stirring, 200 rpm.

Comparative Samples were Prepared in the Similar Manner.

Samples A1, A2, B1 and B2 were kept in closed flasks and samples C1, C2, D1 and D2 in open flasks.

Figure 2:
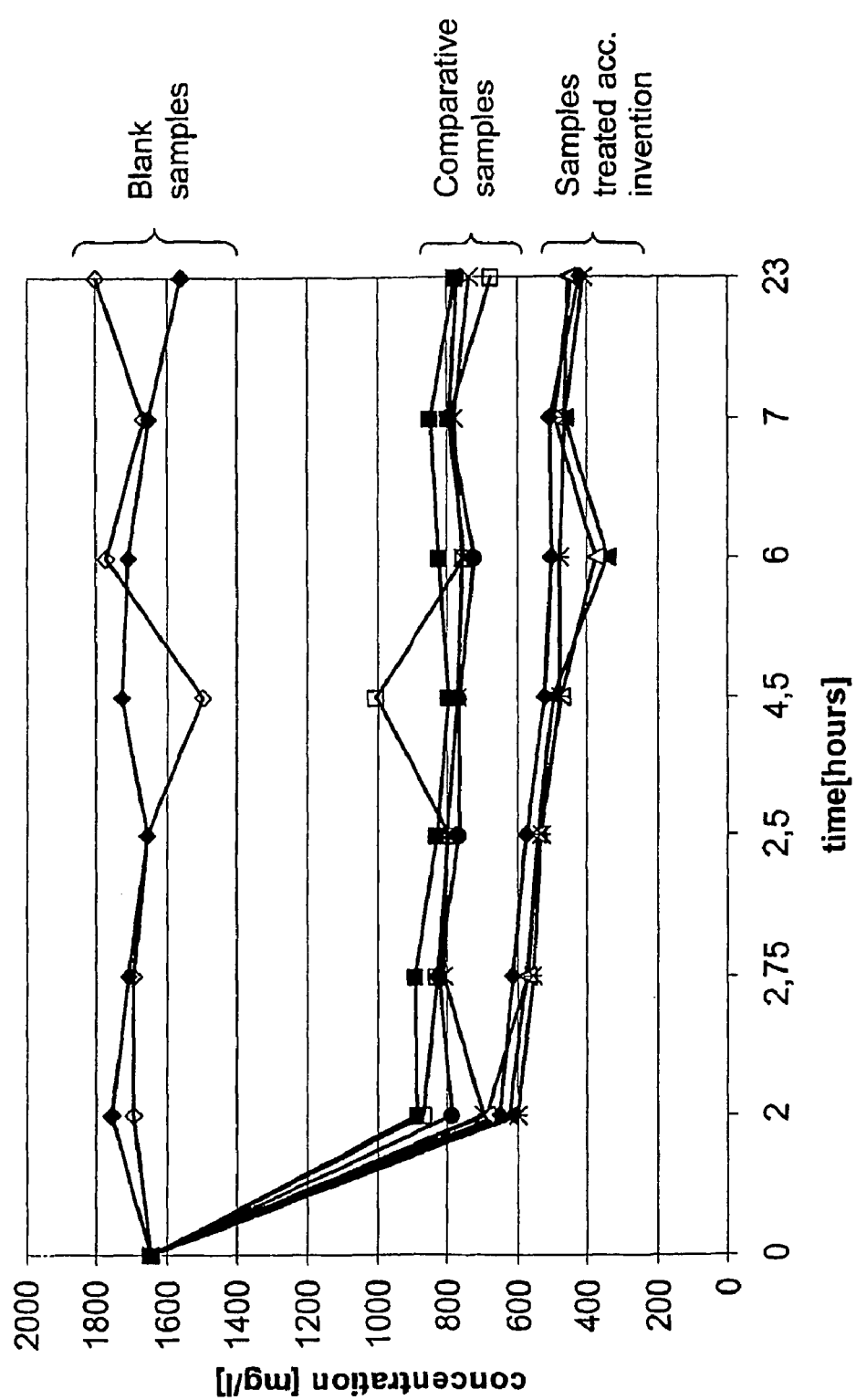
FIG. 2 is a graph showing a comparison between the absorption material prepared according to the present invention and conventionally heat-treated vermiculite with respect to its capacity to remove ammonium ions from sewage water.

The results are shown in FIG. 2. It can be concluded that the absorption material according to the present invention had clearly more efficient intake of ammonium ions from the sewage water than conventional vermiculite material. A reduction of ammonium ions from 1600 mg/l to 850 mg/l for commercial vermiculite and to 600 mg/l for vermiculite prepared according to invention could be observed in two hours.

Example 3

Greenhouse Experiments

Greenhouse experiments were conducted in order to test the efficiency of the ammonium doped vermiculite, which had been heat treated according to the present invention, as a nitrogen fertilizer.

The following seed provenances were used: spruce provenance Högseröd FP31 Assi Döman AB and pine provenance Hortlax pl 401 S94/0385 SCA.

KDR vermiculite, which was thermally treated in 440° C., and had a grain size 1-2 mm, was used in the experiments. Prior to greenhouse experiments the part of the vermiculite material was used to treat reject water of a biogas plant, whereby ammonium ions were doped, i.e. absorbed, into its structure. Moisture content was determined at +105° C. to 12 and 5 weight-%, respectively, for ammonium doped and un-doped vermiculite.

The following substrate mixtures were used:

C50=50/50 volume-% sand/un-doped vermiculite

D50=50/50 volume-% sand/ammonium doped vermiculite

C100=100% un-doped vermiculite

D100=100% ammonium doped vermiculite

Grain size of the used sand was 0.9 mm±0.1 mm.

Growing boxes of Panth model, with 121 containers were used. Four boxes constituted 1 $m^2$.

Water was added to the un-doped substrate mixtures in amount of 300 ml/l, and to the doped substrate mixtures in amount of 230 ml/l. When water was added to the un-doped substrate mixtures, a temperature increase from 20 to 65° C. was observed during a couple of minutes, The substrate mixture was filled into 30 containers, 55-60 ml per container, per treatment.

Seeding was carried out with 2 seeds/container. The containers were regularly irrigated. To maintain high air humidity, the growing boxes were covered with plastic, which was substituted by fiber cloth when seedling emergence commenced after one week and was removed after an additional week. Growing temperature was about 20° and day length >18 hours. Growing boxes were watered at regular intervals. In containers with 2 living seedlings, one of the seedlings was removed after 5 weeks for pine and after 7 weeks for spruce. After 19 weeks, 10 seedlings were randomly sampled from each treatment, cut at the substrate surface and individually photographed. After drying at 70° C. for 24 hours the dry matter weight was determined.

After 5 weeks, half of the boxes were irrigated with a nutrient solution of phosphorus, potassium, magnesium and boron once a week with the following application rates:

| | |
|---|---|
| Phosphorus: | 0.2-0.49 $g/m^2$/week |
| Potassium: | 1.04-2.5 $g/m^2$/week |
| Boron: | 0.004-0.008 $g/m^2$/week |
| Magnesium: | 0.10 $g/m^2$/week |

Phosphorus, potassium and boron were applied with increasing application rate, and magnesium with constant application rate during the growing period.

After 5 months of growing, needles of the pine and spruce seedlings growing in substrate mixtures comprising doped vermiculite, i.e. D50 and D100, had a nitrogen content of more than 3% without irrigation of the above described nutrient solution.

Needles of the pine and spruce seedlings, which were growing in substrate mixtures comprising doped vermiculite, i.e. D50 and D100, and which had been irrigated with the nutrient solution had nitrogen content of more than 2%

For other substrate mixtures comprising un-doped vermiculite, the nitrogen content of the seedling needles was between 0.8 and 1.4%, irrespective of irrigation with the nutrient solution.

Seedling weight after 5 months for seedlings grown in substrate mixture comprising pure doped vermiculite, i.e. D100, was 131 mg for pine and 78 mg for spruce. Seedling weights for seedling grown in substrate mixture comprising doped vermiculite and sand mixture, i.e. D50, was 118 mg for pine and 60 mg for spruce. Both values were obtained without irrigation with the nutrient solution.

Seedling weight for pine was 350 mg in substrate mixture comprising pure doped vermiculite, i.e. D100, and 763 mg in substrate mixture comprising both doped vermiculite and sand, i.e. D50. Both values obtained for seedlings grown with nutrient solution irrigation.

Seedling weight for spruce was about 280 mg, with no difference between substrate mixtures D50 and D100.

Seedling weight for seedlings grown in substrate mixture comprising pure un-doped vermiculite, i.e. C100, was 61 mg for pine and 35 mg for spruce. Seedling weights for seedling grown in substrate mixture comprising un-doped vermiculite and sand mixture, i.e. C50, was 75 mg for pine and 39 mg for spruce. Both values were obtained without irrigation with the nutrient solution.

Corresponding seedling weights for seedlings irrigated with the nutrient solution were 121 mg for pine and 52 mg for spruce, and 97 mg for pine and 54 mg for spruce, for substrate mixtures C100 and C50, respectively.

It can be thus concluded that the vermiculite material that is heat treated according to the present invention can take in ammonium from the reject water of a biogas plant and release the in-taken ammonium to fertilization purposes. Thus vermiculite according to the present invention can be used to clean or remove ammonium from ammonium rich environments and the ammonium-doped vermiculite can be then be reused as a soil improver in soils in need of nitrogen.

The seedlings of spruce and pine grew significantly better in a substrate comprising ammonium-doped vermiculite according to the present invention. The seedlings were able to take in the ammonium absorbed on the vermiculite and use it for their biological processes.

It will be appreciated that the essence of the present invention can be incorporated in the form of a variety of embodiments, only a few of which are disclosed herein. It will be apparent for the specialist in the field that other embodiments exist and do not depart from the spirit of the invention. Thus, the described embodiments are illustrative and should not be construed as restrictive.

The invention claimed is:

1. Method for improving vermiculite's intake of ammonium comprising
heating of the crude vermiculite,
wherein the heating is conducted at a temperature range of 300 to 460° C. where vermiculite's third reversible dehydration step takes place, the temperature remaining lower than the temperature where vermiculite's fourth irreversible dehydration/dehydroxylation step takes place.

2. Method according to claim 1, wherein the heating is conducted to a temperature where the vermiculite's interplane distance $Cd_{002}$ is in the range of 9.9-12 Å.

3. Method according to claim 1, wherein the heating is conducted at a temperature range of 420-460° C.

4. Method according to claim 1, wherein impurities are removed from the crude vermiculite before heating.

5. Method according to claim 1, further comprising
milling the crude vermiculite to a grain size of 200 µm-4 mm before heating.

6. Absorption material, comprising vermiculite material and additives, wherein at least 50% of the vermiculite material comprises vermiculite prepared according to the method of claim 1, which has undergone the third dehydration step but not the fourth dehydration/dehydroxylation step.

7. Material according to claim 6, wherein the vermiculite's interplane distance $Cd_{002}$ is in the range of 9.9-12 Å.

8. Absorption material according to claim 6, characterised in that wherein the grain size of the material is 200 µm-4 mm.

9. Method of removing ammonium from environment, comprising
mixing the absorption material according to claim 6, with an environment medium and
allowing the absorption material to react with the medium in order to remove the ammonium ions to a desired level.

10. Method according to claim 9, further comprising
heating the environment medium during the ammonium ion removal.

11. Method according to claim 2, wherein the heating is conducted to a temperature where the vermiculite's interplane distance $Cd_{002}$ is in the range of 10-11.5 Å.

12. Material according to claim 7, wherein the vermiculite's interplane distance $Cd_{002}$ is in the range of 10-11.5 Å.

13. Method of removing ammonium from environment of claim 9, wherein said environment medium is selected from the group consisting of soil, gas and sewage water.

14. A method of absorbing ammonium comprising
mixing a vermiculite prepared according to claim 1 with a medium which contains ammonium ions, and
allowing the vermiculite to absorb said ammonium ions.

15. A method of fertilizing or conditioning soil, comprising
heating vermiculite at a temperature range of 300 to 460° C. where vermiculite's third reversible dehydration step takes place, the temperature remaining lower than the temperature where vermiculite's fourth irreversible dehydration/dehydroxylation step takes place, and subsequently
contacting said vermiculite with a source of ammonium ions for a time sufficient to permit said vermiculite to at least partially absorb said ammonium ions, and subsequently
mixing said vermiculite with soil, thereby allowing said vermiculite to release said ammonium ions into said soil.

* * * * *

UNITED STATES PATENT AND TRADEMARK OFFICE
CERTIFICATE OF CORRECTION

| | |
|---|---|
| PATENT NO. | : 7,927,039 B2 |
| APPLICATION NO. | : 11/993771 |
| DATED | : April 19, 2011 |
| INVENTOR(S) | : Olav Eklund et al. |

It is certified that error appears in the above-identified patent and that said Letters Patent is hereby corrected as shown below:

In Item [73] on the cover page, 2nd Assignee, should be changed to --Ab Yrkeshogskolan Vid Abo Akademi/Yrkeshogskolan Novia--.

Signed and Sealed this
Seventh Day of June, 2011

David J. Kappos
*Director of the United States Patent and Trademark Office*